United States Patent [19]
O'Connor

[11] 3,722,847
[45] Mar. 27, 1973

[54] INSTRUMENT SUPPORT STRUCTURE
[76] Inventor: Chadwell O'Connor, 3490 E. Foothill Blvd., Pasadena, Calif. 91107
[22] Filed: Mar. 1, 1972
[21] Appl. No.: 230,699

[52] U.S. Cl. ............248/407, 248/171, 248/188.3, 248/412
[51] Int. Cl. .................................F16m 11/38
[58] Field of Search......248/408, 407, 411, 412, 170, 248/171, 168, 169, 188.2, 188.3, 188.6, 354 H; 182/17, 200

[56] References Cited
UNITED STATES PATENTS

| | | | |
|---|---|---|---|
| 1,221,306 | 4/1917 | Gall | 248/407 |
| 2,361,781 | 10/1944 | Lindsey et al. | 248/171 |
| 2,864,625 | 12/1958 | Clements | 182/17 |
| 2,908,472 | 10/1959 | McDonald | 248/188.3 |
| 3,334,849 | 8/1967 | Bronder | 248/168 |

*Primary Examiner*—Marion Parsons, Jr.
*Attorney*—C. Frederick Leydig et al.

[57] ABSTRACT

An instrument support structure including a post telescoped in a column, with a lock for adjusting their combined length, and three legs pivoted at the bottom of the column for swinging movement from adjacent the column to extended, base-defining positions. The legs are locked by extendible struts including fluid actuators with one strut interconnecting each leg with the column. Fluid from a reservoir on the column is directed to all actuators when the legs are extended, and then valving is closed to shut off fluid intercommunication and lock the legs. The column and post are triangular in cross section for rigidity. The parts are formed to collapse compactly.

9 Claims, 11 Drawing Figures

Patented March 27, 1973

Patented March 27, 1973
3,722,847
3 Sheets-Sheet 2
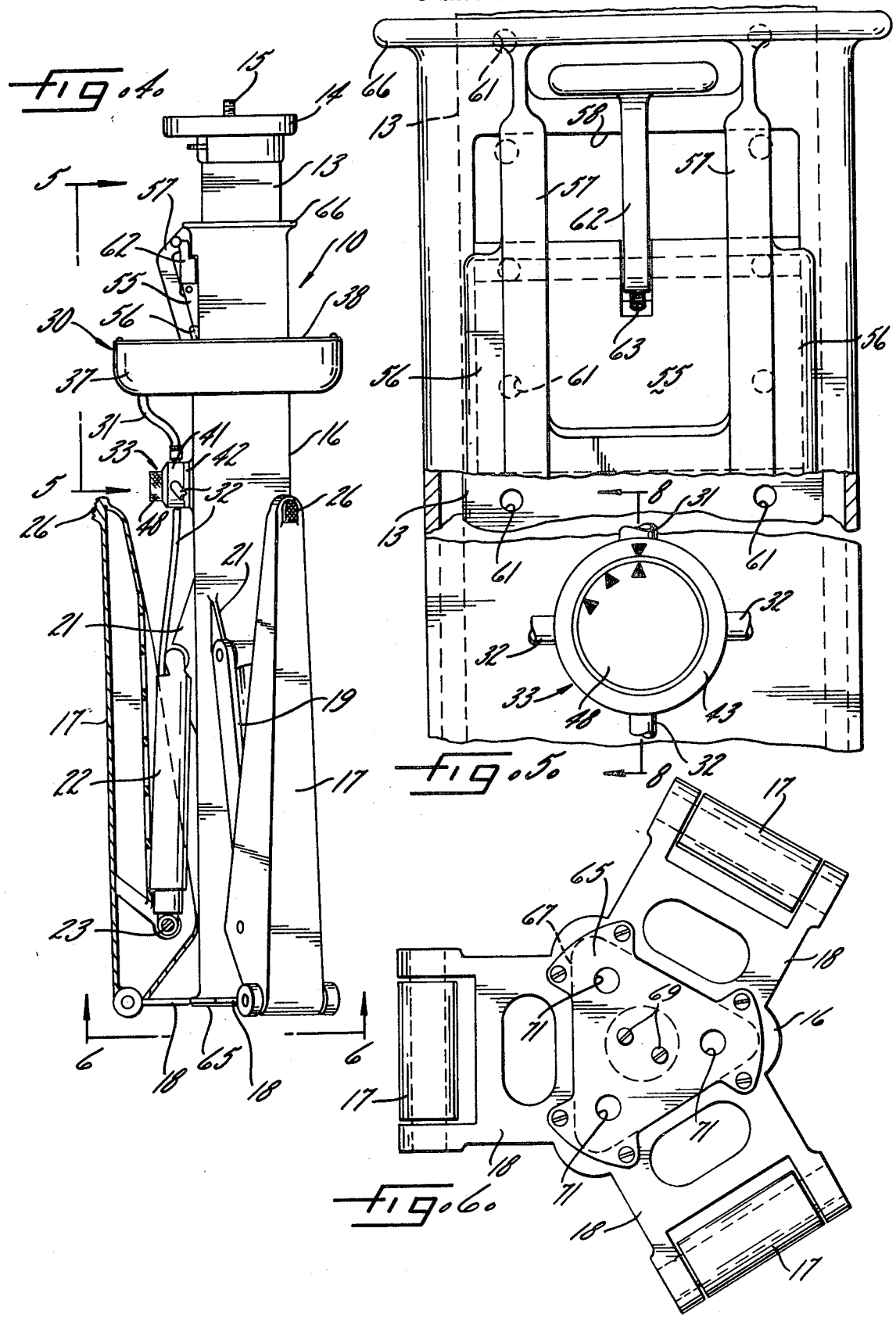

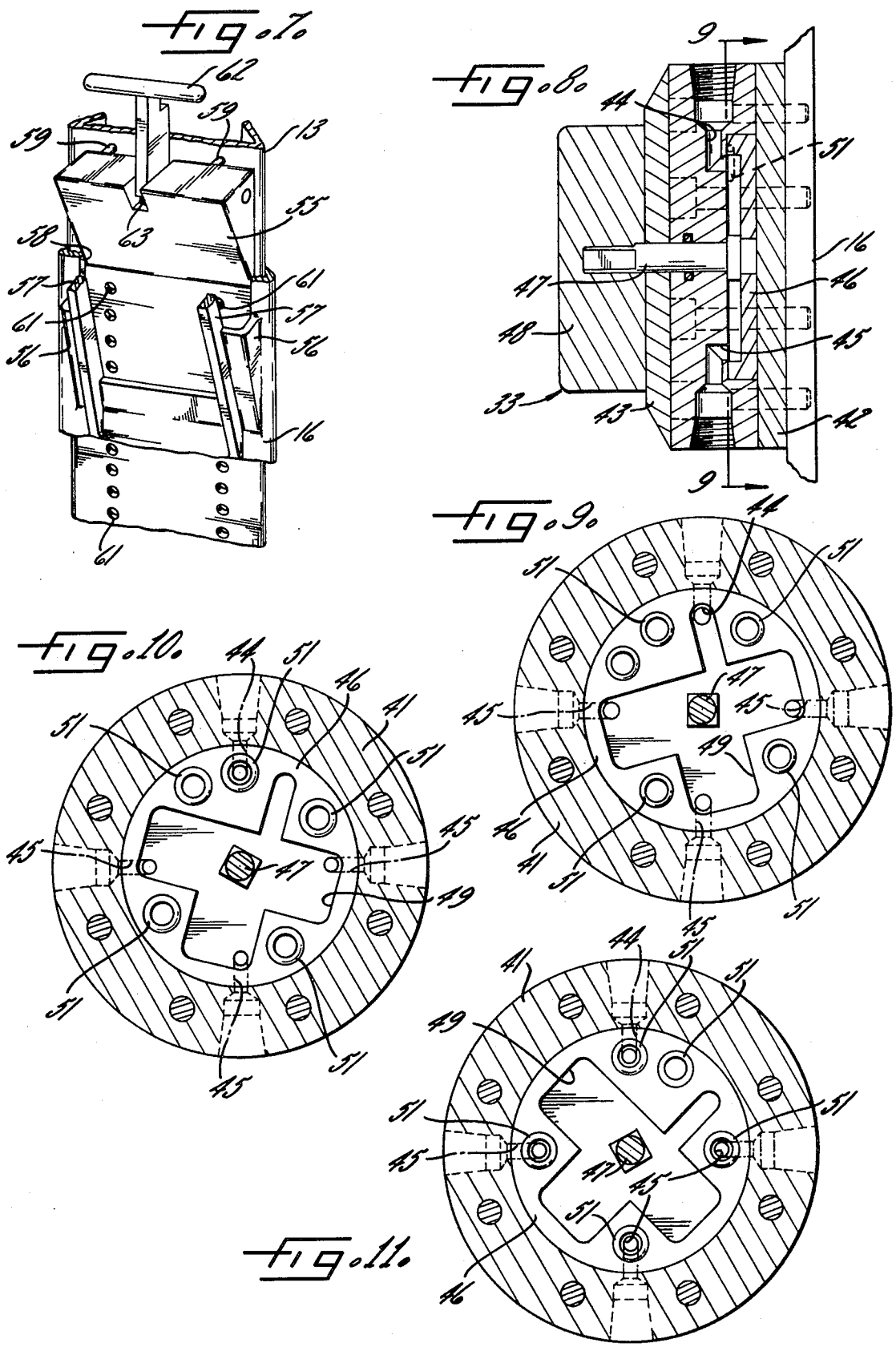

INSTRUMENT SUPPORT STRUCTURE

This invention relates generally to support structures for instruments such as cameras, transits and the like, and concerns more particularly a portable structure intended to replace a conventional tripod.

The primary aim of the invention is to provide an improved instrument support structure that can be easily set up, and again readily collapsed, to provide a solid, vertically adjustable support even on an irregular or sharply sloped surface. A related object of the invention is to provide a support structure of the foregoing character which is much more rigid, both torsionally and laterally, than a conventional tripod.

It is also an object to provide a support structure of the above type which, when collapsed, is compact and easy to carry.

Another object is to provide an instrument support structure of the kind referred to above that presents little interference with the mobility of the instrument user completely around the structure.

A further object is to provide a structure as characterized above that gives relatively large-area footing so as to minimize slipping on or sinking into the underlying surface.

Still another object is to provide a support structure of the above kind that minimizes the danger of damage from inadvertent sudden telescoping of the vertically adjustable elements of the structure.

Other objects and advantages of the invention will become apparent upon reading the following detailed description and upon reference to the drawings, in which:

FIG. 4 is a partial section similar to FIG. 2 with the parts in an alternate position;

FIG. 5 is an enlarged fragmentary elevation taken approximately along the line 5—5 in FIG. 4;

FIG. 6 is an enlarged bottom plan taken along the line 6—6 in FIG. 4;

FIG. 7 is a fragmentary perspective of the locking structure otherwise illustrated in FIGS. 2 and 5;

Figures 1, 2, 3:
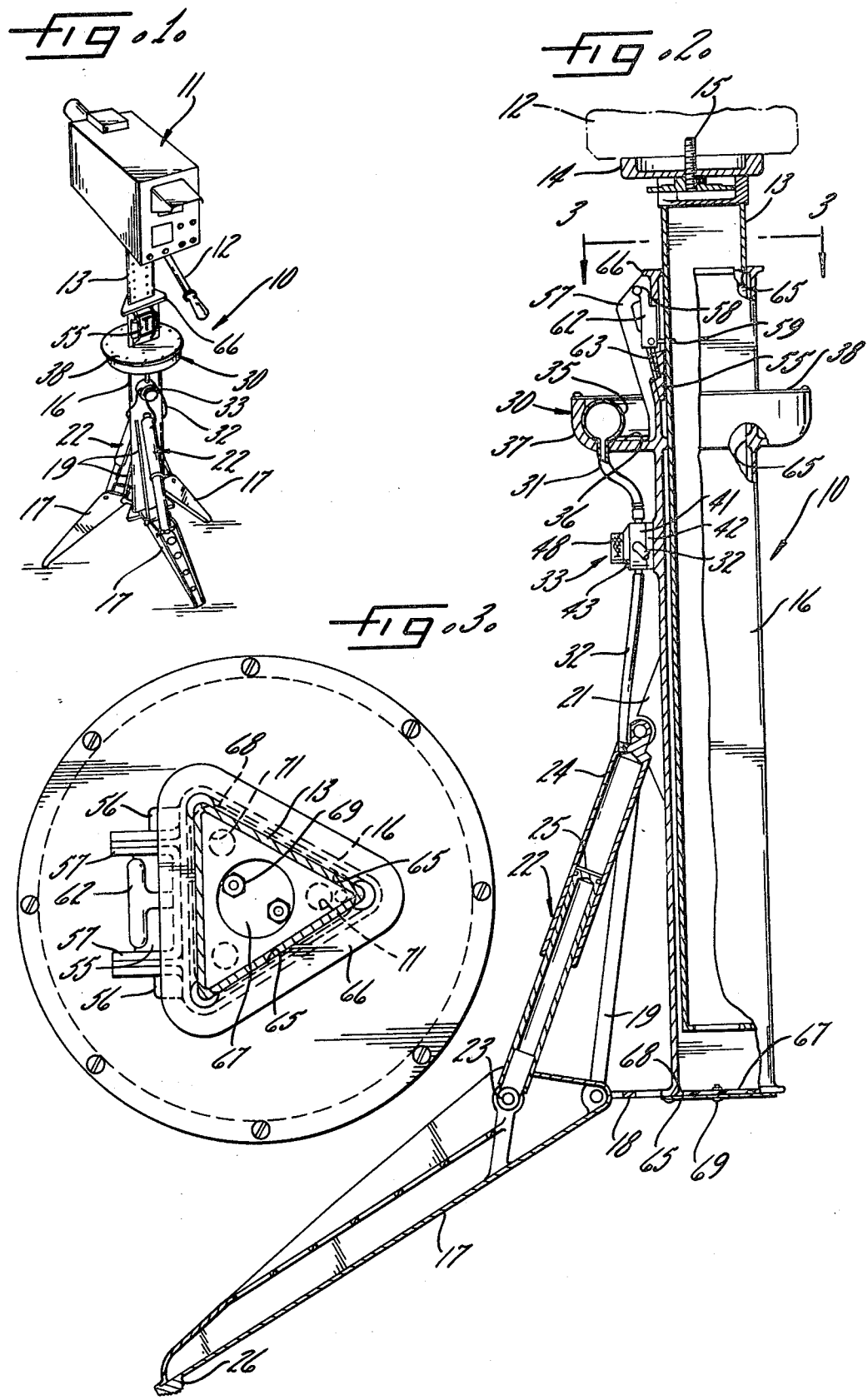
FIG. 1 is a perspective of a support structure embodying the invention and mounting a television camera.
FIG. 2 is an enlarged partial section of the support structure illustrated in FIG. 1.
FIG. 3 is an enlarged section taken approximately along the line 3—3 in FIG. 2.

FIG. 8 is an enlarged section taken approximately along the line 8—8 in FIG. 5; and FIGS. 9, 10 and 11 are sections taken along the line 9—9 in FIG. 8 and illustrating the structure in alternate operating positions.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to FIG. 1, there is shown an instrument support structure 10 embodying the invention and mounting, for illustrative purposes, a camera 11 on a panhead 12. The structure 10 includes a post 13, with an upper plate 14 and a mounting screw 15 permitting attachment to the panhead 12, that is slidably fitted in a column 16 having a plurality of legs 17 pivoted at the lower end of the column for swinging movement between positions adjacent the column (see FIG. 4) to positions extending from the column and defining a base for supporting the structure 10 (see FIGS. 1 and 2).

In carrying out the invention, the post 13 and the column 16 are triangular in cross section and three legs 17 are pivoted on flanges 18, braced by links 19 anchored on lugs 21, at the bottom of each flat side of the column. A plurality of struts 22 including fluid actuators, one for each leg 17, are connected between the column lugs 21 and pivot points 23 on the respective legs. The fluid actuators include cylinder portions 24 and piston portions 25 (see FIG. 2). The legs 17 are arcuate in cross section so as to encase the actuator struts 22 when the legs pivot against the flat sides of the column 16. Pads 26 are formed on the ends of the legs 17 to give relatively large-area footing for the structure 10.

Pursuant to the invention, a fluid reservoir 30 is mounted on the column 16, and fluid lines 31 and 32 and a valve 33 connect the reservoir 30 and the actuator struts 22 so that, when the lines 31, 32 are open, the struts 22 extend and the legs 17 pivot to their base defining positions, whereupon operation of the valve 33 shuts off intercommunication of fluid, first, between the reservoir 30 and the actuator struts 22 and then, second, between the individual actuator struts so as to lock the struts at a given length and thus lock the legs in their given positions. By first directing fluid from the reservoir 30 to the actuator struts, the struts can be extended and the legs swung down to their base defining positions. Then, by shutting off the reservoir but allowing intercommunication between the actuator struts, the post 13 and column 16 can be moved to the desired vertical position with there being compensated relative movement of the actuator struts and the legs 17. Finally, by shutting off the actuator struts from one another, the legs 17 are locked in their adjusted positions. If the structure 10 is placed on uneven or sloping ground, the relative positions of the legs 17 will vary to hold the column 16 vertical, but the adjustment of the legs will be automatic when the column is being positioned with fluid intercommunication between the actuator struts.

As a feature of the invention, the reservoir 30 is formed of resilient material so that the contained fluid is under slight pressure, on the order of several psi, when the legs 17 are up against the sides of the column 16, and the struts 22 overcenter the leg pivot axes with the result that the slight reservoir pressure holds the legs against the column (see FIG. 4). Preferably, the reservoir is in the form of an annular rubber-like donut 35 fitted in an annular chamber 36 defined by a wall 37 formed with the column 16. A ring-like plate 38 closes the chamber 36 but is readily removable thus permitting convenient servicing of the reservoir.

The valve 33, in the preferred structure 10, includes a body 41, a base plate 42 and a dial plate 43 secured together on one flat side of the column 16. The fluid line 31 connects the reservoir 30 to a passage 44 in the valve body 41, and the lines 32 connect the actuator struts 22 to passages 45 in the valve body. A valving disk 46 is rotatably fitted in sandwiched relation between the body 41 and the base plate 42, and a squared end on a stem 47 fits in a correspondingly shaped hole in the disk 46 so that rotation of the stem 47 rotates the disk. A knob 48 is fitted on the outer end of the stem 47 for manually positioning the disk 46.

The disk 46 is formed with a groove 49, having a modified cross configuration, facing the valve body 41 and the passages 44, 45. In addition, a plurality of O-rings 51 are fitted into annular grooves in the disk 46 between the legs of the cross-like groove 49 so that the O-rings 51 ride against the adjacent surface of the valve body 41. With the disk in the angular position shown in FIG. 9, the reservoir passage 44 is open, through the groove 49, to all of the actuator strut passages 45. Rotating the knob 48, and hence the disk 46, approximately 30° clockwise to the FIG. 10 positions results in the actuator strut passages 45 remaining in fluid intercommunication through the groove 49, but the reservoir passage 44 is then sealed off by one of the O-rings 51. Another 30° turn clockwise to the FIG. 11 position results in all of the passages 44, 45 being sealed off by four of the O-rings 51. The valve 33 is therefore turned to the FIG. 9 position when the legs are being moved down to their base defining positions. The valve 33 is moved to its FIG. 10 position when the legs are down and the column 16 is being adjusted to a vertical position on whatever terrain the structure 10 is located, and the valve is moved to its FIG. 11 position to lock the legs in their adjusted, base defining positions. With the legs up adjacent the column 16, and the valve 33 in its FIG. 9 position, the pressure in the reservoir 30 exerts an extending force on each of the actuator struts 22 which are then overcentered with respect to the pivot points of the legs 17 so as to hold the legs in their folded, against the column, positions.

In order to lock the post 13 and the column 16 in selectable length-adjusted positions, a wedge block 55 is shaped to fit in tapered flanges 56 which are reinforced with brackets 57 adjacent an opening 58 at the top of the column 16. The block 55 fits in the opening 58 and carries two fixed pins 59 adapted to be received in any pair of a series of holes 61 spaced incrementally along the length of the post 13. A handle 62 is pivoted on the block 55 for convenience in handling, and the handle is biased to a normally out-of-the-way position between the brackets 57 by a spring urged pin 63 in the body of the block 55.

To adjust the post 13 in the column 16, the post is lifted relative to the column so that the wedge block 55 loosely clears the flanges 56 (see FIG. 7). The handle 62 allows the block 55 to be pulled from the post 13 thereby retracting the pins 59 from the holes 61 into which they were fitted, although the brackets 57 prevent the wedge block 55 from being completely separated from the assembly. The post 13 is repositioned to the desired telescoped relation with respect to the column 16, the wedge block pins 59 are inserted into the nearest set of the holes 61, and slight downward movement of the post 13 relative to the column 16 reseats the wedge block 55 in the flanges 56. This not only blocks further downward movement of the post in the column, but also wedges the triangular post against triangular ribs 65 formed, for greater strength, within the reservoir wall 37 and at a top flange 66 on the column 16 (see FIG. 2). The force of the wedge block 55 is about midway between the ribs 65, and the result is a tight lock between the column 16 and the post 13 which becomes even tighter with the addition of instrument weight on the top of the post.

In order to cushion an inadvertent full collapsing movement of the post 13 down into the column 16, the bottom of the column is closed by a plate 65 having three openings 71 (see FIG. 6) that are covered by a flexible triangular flap valve element 67 whose periphery 68 (see FIG. 3) is virtually coextensive with the cross section of the column 16. The element 67 is secured to the plate 65 by bolts and nuts 69. The flexible element 67, preferably formed of rubber-like sheet material, resists movement of air down and out of the column 16 through the openings 71 and thus creates a pneumatic cushion against rapid telescoping collapse of the post 13 in the column 16, although upward movement of the post is unimpeded as the corners of the element 67 flex away from the plate 65 to freely admit air through the openings 71 into the column.

It will be appreciated that the triangular cross sections of the post 13 and the column 16 make the support structure 10 quite rigid both with respect to torsional loading as well as considering resistance to lateral movement. When collapsed, the support structure 10 is compact and it can be readily seen that a fully expanded length of approximately twice the collapsed length can be attained. The pedestal-like nature of the post and column assembly presents little interference with the mobility of the instrument user completely around the support structure. It has already been pointed out how the support structure 10 can be quickly and easily set up even on very irregular or sharply sloped surfaces. Returning the structure to collapsed position is accomplished by simply returning the valve 33 to its FIG. 9 position and manually folding up the legs 17 one by one.

I claim as my invention:

1. An instrument support structure comprising, in combination, a column, a plurality of legs pivoted at the lower end of said column for swinging movement between positions adjacent the column to positions extending from the column to define a base for supporting the column upright, a plurality of struts including fluid actuators each connected between said column and one of said legs so as to define one extendible strut for each of the legs, a reservoir mounted on said column and containing fluid, and means including a valve for selectively (1) opening said reservoir to all of said actuators so that, when so opened, the struts extend and the legs pivot to their base defining positions, (2) shutting off said reservoir while allowing intercommunication of fluid between the actuators, and (3) shutting off intercommunication of fluid between the individual actuators so as to lock the struts at given lengths and thus lock the legs in given positions.

2. The combination of claim 1 including a post slidably fitted in said column and extendible therefrom to vary the total length of the post and column, and means for locking said post and column in selectable length-adjusted positions.

3. The combination of claim 2 including a bottom plate closing the bottom of said column, said plate having an opening therethrough, and a flap valve element secured to said plate to overlie said opening and resist movement of air down and out of said column through said opening.

4. The combination of claim 2 in which both said column and said post are triangular in cross section with the post fitting closely in the column.

5. The combination of claim 1 in which said column is triangular in cross section and there are three legs pivoted for swinging movement against each of the flat column sides when the legs are in said adjacent-the-column position.

6. The combination of claim 5 in which said legs are arcuate in cross section so as to encase said struts when the legs pivot against the flat column sides.

7. The combination of claim 1 in which said reservoir is formed of resilient material so that fluid therein is under resilient pressure when said legs are pivoted adjacent the column.

8. The combination of claim 7 including a wall defining an annular chamber surrounding said column, said reservoir being annular in shape and enclosed within said chamber.

9. The combination of claim 7 in which said struts overcenter the pivot axes of said legs when the legs are in said position adjacent the column so that the resilient pressure on said fluid urges the legs toward the column when they are positioned adjacent the column.

* * * * *